United States Patent Office 3,250,264
Patented May 10, 1966

3,250,264
ENGINE IMPROVEMENTS
Earl Bartholomew, Birmingham, Mich., assignor to Ethyl Corporation, New York, N.Y., a corporation of Virginia
Filed Mar. 29, 1965, Ser. No. 445,856
39 Claims. (Cl. 123—127)

The present application is a continuation-in-part of S.N. 301,249, filed August 12, 1963 and now abandoned; S.N. 314,814 filed Oct. 12, 1963 and now Patent No. 3,198,187; S.N. 408,135, filed Nov. 2, 1964; and S.N. 427,636 filed Jan. 25, 1965; all of which prior applications are in turn continuations-in-part of S.N. 171,856 filed Feb. 8, 1962 and now Patent No. 3,171,395.

The present invention relates to spark ignition internal combustion engines such as those that use gasoline as fuel.

Among the objects of the present invention is the provision of improved engine constructions and methods of operation that enable such engines to use fuel more efficiently and also sharply reduce the emission of carbon monoxide as well as of unburnt or partially burnt fuel.

Additional objects of the present invention include the provision of novel induction systems and novel carburetion systems that make the foregoing results possible.

The above as well as still further objects of the present invention will be more fully understood from the following description of several of its exemplifications, reference being made to the accompanying drawings wherein:

FIG. 5 is a sectional view of a modified portion of the apparatus of FIGS. 1 and 2.

Figure 1:
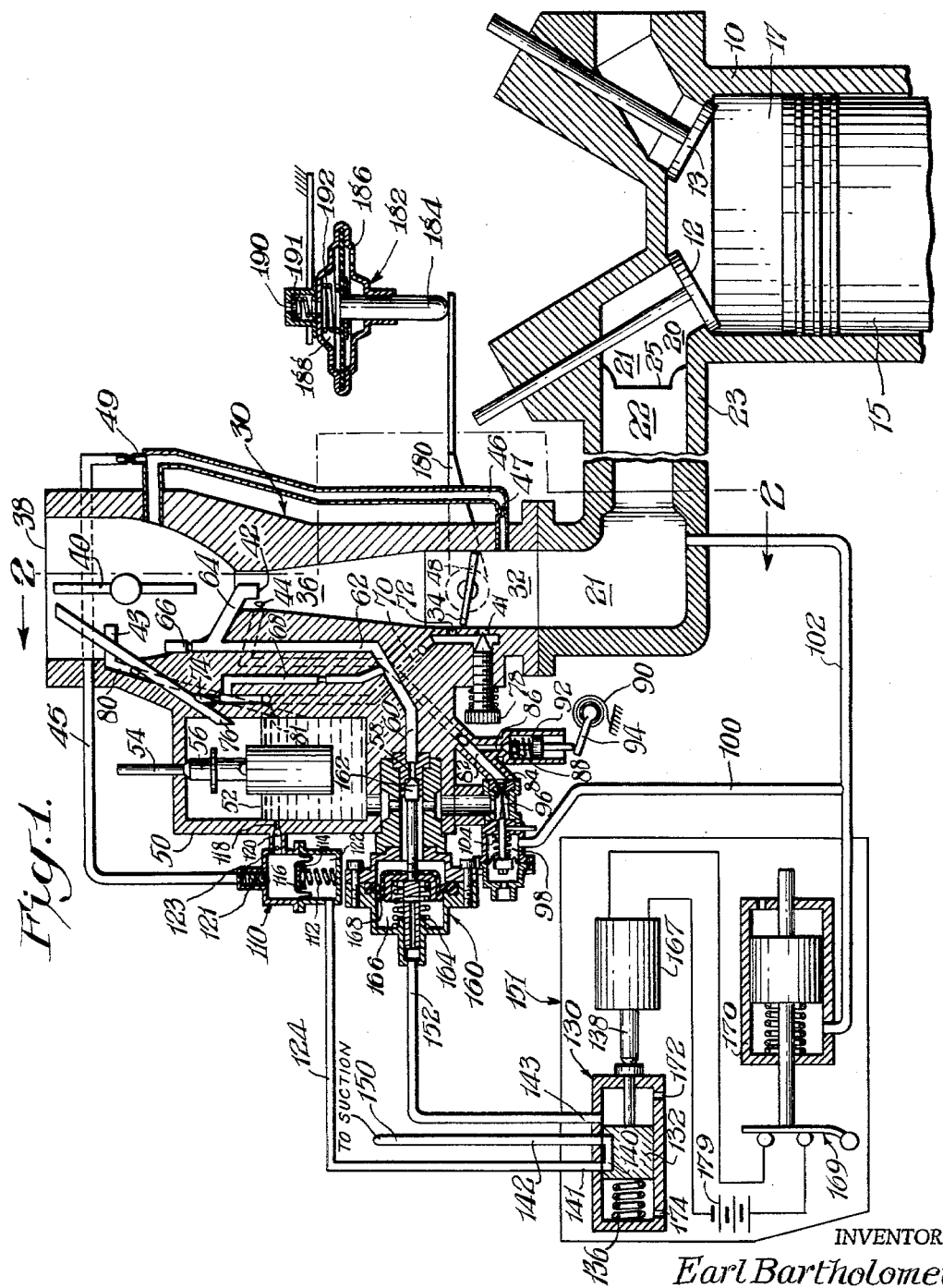
FIG. 1 is a vertical sectional view, partly diagrammatic, of a portion of a gasoline engine representative of the present invention.

For an ideal gasoline engine, gasoline is vaporized in the air stream flowing through the carburetor and intake manifold and is delivered in equal amounts to the individual engine cylinders along with equal quantities of air. However, in actual operation, due to various practical limitations, only a portion of the fuel, comprising largely lower-boiling constituents, is truly varorized in the carburetor and intake manifold. An additional portion of the gasoline, because of the velocity of the air, moves through the intake manifold by entrainment in the air stream as small droplets. The amount of gasoline that can be so transported is small when velocity in the intake manifold is low but increases when the velocity becomes higher. The remaining fuel, containing a large concentration of high-boiling hydrocarbons and high-boiling antiknock compounds which have been added to the fuel, remains in liquid form, flows along the walls of the intake manifold and distributes unequally to the cylinders.

This pattern of transportation of fuel from the carburetor to the engine cylinders produces several undesirable results which are most evidenced at low engine speeds where air velocity through the carburetor and intake manifold is at a minimum. Inasmuch as the unvaporized liquid fuel and antiknock compounds are unequally distributed to the cylinders, the total amount of fuel and antiknock compound entering the individual cylinders varies considerably. Since the cylinders receive substantially equal amounts of air, the unequal distribution of liquid causes differences in the ratio of fuel-to-air in the cylinders as well as variations in the amounts of antiknock compounds. Thus the quality as well as the quantity of fuel varies from cylinder to cylinder. Since one or more cylinders receive fuel which has lower antiknock quality than that of the whole fuel, knocking is more pronounced than it would be if all constituents of the fuel were equally distributed. If the less volatile constituents of the fuel have higher antiknock quality than the more volatile components, as is often the case when aromatic hydrocarbons and metallic antiknock compounds are present, the antiknock quality of the fuel is lowest in the cylinders which receive the smallest amount of unvaporized liquid fuel. Moreover, the mixture ratio in these cylinders usually is closer to that which produces maximum knock. In consequence, the cylinders receiving the leanest mixture have an even greater tendency toward knocking.

In order to insure firing and knock-free operation of the lean cylinders, it has been the practice to supply a richer mixture at the carburetor. This enrichment of the mixture is detrimental to fuel economy. Moreover, because the excess fuel in the richer cylinders is not completely burned, exhaust products high in carbon monoxide and in unburned and partially burned hydrocarbons are discharged to the atmosphere. These noxious gases contribute to atmospheric pollution known as smog and, hence, it is desirable that such emissions be kept at as low a level as possible.

Richer mixtures than that for maximum economy are required for highest power. As the mixture is made richer than that for maixmum power, the rate of power decrease is small, but as the mixture is made leaner the rate of power loss is large. Thus, maximum power of currently produced automobile engines is obtained when the leanest cylinders receive approximately the best power mixture. Because of the maldistribution of fuel, the other cylinders receive richer mixtures. Fuel economy is less than would be obtainable with equal distribution of fuel, and the emission of unburned hydrocarbons and carbon monoxide is greater.

Low velocity in the intake manifold is even more detrimental during acceleration at low engine speed. When the throttle is opened quickly, the vaporized and unvaporized fuel and antiknock compound must be accelerated before they can be carried along in the air stream. The vaporized molecules and unvaporized droplets have high inertia relative to that of air molecules, and hence, considerable air velocity is required to prevent lag of a large part of the fuel and antiknock compound in the manifold until higher engine speed is reached. Automobile carburetors compensate for this lag by supplying additional fuel—often as much as several milliliters—at the beginning of full-throttle acceleration. This supplementary fuel causes a further loss of fuel economy and an additional increase in emission of atmospheric pollutants.

The maldistribution of antiknock compound under conditions of steady operation and the lag during acceleration at low engine speed, both decrease the effectiveness of antiknock compounds. Compensation for this reduced effectiveness is variously provided in persent automobiles by still richer mixtures, retarded ignition timing, lower compression ratios or fuels of higher octane number.

From the standpoints of atmospheric pollution and reduced fuel economy, the largest effects of low velocity in the intake manifold occur during engine starting and warm-up. Because of low engine temperature during these events, fuel vaporization is at a very low level. In addition, because of low manifold velocity, only a small amount of fuel can be carried along by entrainment in the air stream. As a consequence, heavy choking of the carburetor is employed to supply a very large volume of fuel in order for the vaporization of the most volatile constituents to be sufficient to form a combustible mixture in the cylinders. During cold starting the ratio of pounds of air to pounds of fuel varies from about 2 to 10 with a typical value 7, whereas the stoichiometric ratio is in the region of 14. For several miles of operation during warm-up, the choke is partially closed. Although the mixture ratio is not as rich as during starting, it is nevertheless far richer than after warm-up. The fuel delivered by the carburetor which is in excess of the amount that can be burned with the air in the cylinders appears as unburned or partially burned constituents in the exhaust products. Operation with the choke at various degrees of closure accounts in a large measure for the poor gasoline economy in city driving as well as for a high percentage of the atmospheric pollution attributable to automobiles.

Because of the economic importance of reduced fuel economy and depreciated effectiveness of antiknock compounds, and the physiological effects of smog, all attributable in substantial measure to the rich fuel-air mixtures necessitated by low velocity in intake manifolds, a large potential for further development of automobile engines resides in improvement of fuel induction systems.

The emission through the engine exhaust of unburned or partially burned fuel is also greatly increased even in an ideal engine, when it is decelerated as by conventional closing of the throttle. The engine then reduces its operating speed, but during this speed reduction it does not burn its fuel properly. Where the engine powers an automobile the closing of the throttle during operation causes the inertia of the automobile to greatly prolong the speed reduction, particularly if the engine is coupled through an all-mechanical transmission, and this stretches out the time during which fuel is improperly burned.

According to the present invention a gasoline engine has gasoline supply means for delivering gasoline to at least one cylinder, air supply means including a throttle control for delivering air along with the gasoline to provide an explosive mixture, both of said means being connected for limiting the reduction of air delivery when the throttle control is abruptly closed so that the air delivery rate falls gradually rather than abruptly, both of said means being further connected to essentially shut off the delivery of gasoline if the throttle control is abruptly closed and at that time the engine is running at more than 1450 r.p.m.

A further improvement in engine operation is obtained by using a pair of parallel intake manifolds to separately connect each engine cylinder to both the gasoline supply means and the air supply means, one of the manifolds having an effective cross-sectional area from about 1.2 to about 5 times the effective cross-sectional area of the other, and both the gasoline supply means and the air supply means are connected to deliver gasoline and air only through the manifold of smaller cross-section when the power requirement is within the capacity of the small induction system. In addition, the gasoline supply means and air supply means can be further connected to deliver gasoline and air essentially only through the manifold of larger cross-section when the demand for power is larger than can be readily supplied through the manifold of smaller cross-section.

A carburetion apparatus particularly suitable for use in connection with the manifold of smaller cross-section pursuant to the present invention, does not have an acceleration pump but has a liquid fuel bowl, an air supply conduit including a venturi, a throttle valve in said conduit and connected to seat against the conduit walls to prevent any significant passage of air between the valve and the walls when the valve is so seated, by-pass elements connected to by-pass an idle air flow stream from one side of the valve to the other when the valve is so seated, fuel control elements connected to (a) control the flow of fuel from the bowl to the air supply conduit, (b) shut off such fuel flow when vacuum downstream of the throttle valve increases substantially above idle vacuum, and (c) supply an extra amount of fuel to the air supply conduit when such shut-off is terminated, and throttle-closing delay means connected to prevent the throttle from closing abruptly.

It is particularly desirable to use a power fuel supply mechanism for delivering extra fuel from the carburetor bowl to the air supply conduit when the carburetor is called upon for maximum or near maximum power, and to modulate the power fuel supply so that it supplies more extra fuel when the engine is operating at low temperature than it does when the engine is operating at more normal higher temperatures. This delivery of power fuel can also be varied in accordance with changes in power demand, as by having it controlled by manifold vacuum.

The carburetion apparatus can also have a second air supply conduit parallel to the first air supply conduit and with a cross-sectional area between about 1.2 and 5 times the cross-sectional area of the first conduit. The second air supply conduit need have no provision for an idle air flow and likewise need have no provision for an idle fuel flow. Another simplification is to eliminate from the second air supply conduit any provision for a special power fuel flow.

The second air supply conduit is connected to a separate intake manifold that runs to each cylinder of the engine and parallels an intake manifold that is connected to the first air supply conduit. Each conduit has its own throttle valve and a selector mechanism is preferably connected to essentially keep both throttles from being simultaneously open.

The combination of all of the above features provides an engine that exceeds by far all requirements that have been officially set for minimizing engine exhaust emissions of the type considered conducive to smog formation, and this is accomplished without the expense and awkwardness of an exhaust treating accessory. An added feature of the present invention is that fuel is so much more efficiently used that fuel economy measured in miles of automobile driving per gallon is increased by about 15 or more percent. This more than compensates for the engine components that are added in order to accomplish the foregoing results.

Some of the added components can also be omitted without detracting too much from the improved efficiency and without dropping below the smog-inhibiting standards.

Referring now to the drawings, FIG. 1 illustrates in somewhat schematic form a four-stroke or so-called "four-cycle" gasoline engine suitable for use in propelling automobiles, and having a number of cylinders, one of which is shown at 10. Cylinder 10 has the usual intake and exhaust valves 12, 13 respectively for admitting fresh gasoline-air mixture into, and exhausting burnt mixtures from, the cylinder. A piston 15 is arranged to reciprocate within the cylinder and defines a combustion zone or chamber 17 which is fitted with a spark plug (not shown) for igniting the incoming mixture after it is compressed by the piston.

The fresh gasoline-air mixture is admitted by intake valve 12 from an intake port 20 which communicates through an intake manifold assembly 23 with a carburetor 30 that mixes gasoline with air and delivers the mixture to the manifold assembly for distribution to the intake ports of the various cylinders. The manifold assembly 23 has two parallel manifolds 21 and 22 separated by a wall 25 and both extending to each intake port where they both open to the port and to each other.

Figure 2:
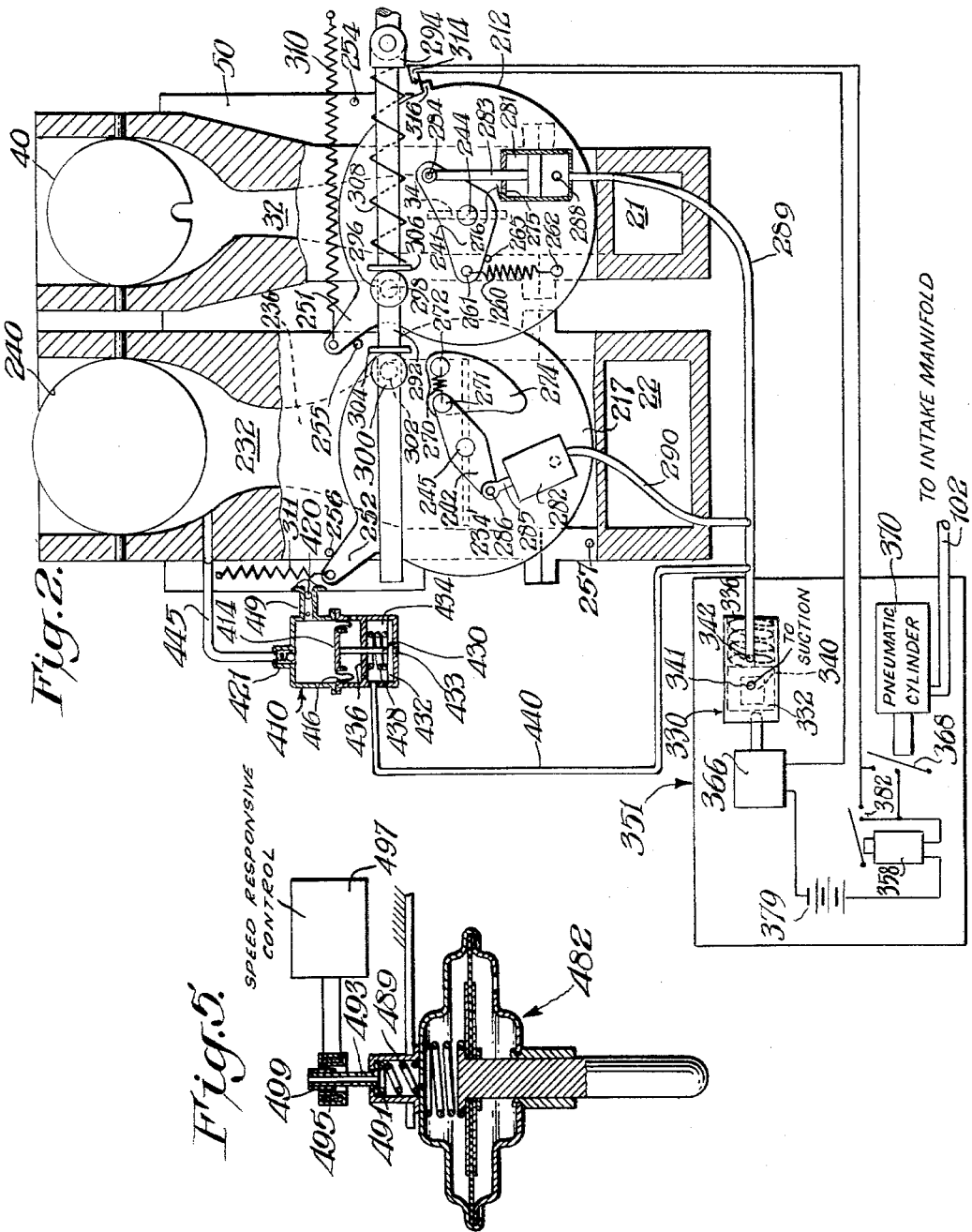
FIG. 2 is a vertical sectional view taken approximately along the line 2—2 of FIG. 1 showing additional details of the engine.

In FIG. 1 the carburetor 30 is illustrated in such a way as to only show its coaction with manifold 21. Its relationship with manifold 22 is illustrated in FIG. 2. Manifold 21 communicates with a carburetor throat 32 having a butterfly type throttle valve 34, a venturi 36, an air horn 38 that can be fitted with a choke valve 40, and a number of fuel supply passages 41, 42, 43, 44 and 45. An extra by-pass 46 is also shown as establishing communication between the portions of throat 32 upstream and downstream of the throttle valve, and the throttle valve itself has a by-pass passageway 48.

All fuel reaches the throat 32 from a fuel bowl 50 where a body of fuel 52 is received from a fuel line 54 under the control of a float valve 56 so that the level of the fuel in the bowl is maintained substantially constant. The principal delivery of fuel from the bowl to the carburetor throat is through a main jet orifice 58 normally in open communication with the lower portion of the fuel in bowl 50, and leading to the venturi in the throat through passageways 60, 62 and 64. An air bleed 66 can also be provided at the high point in this chain of passageways.

For idling of the engine an auxiliary passageway 68 branches from passageway 60, communicates with idling passageway 70 that terminates in idle port 41, and can have a transfer port 72 a short distance upstream of the idle port. An air bleed 74 communicates between the highest point of the idle passageways and the external air as by opening into a bowl vent tube 76 that runs from the upper portion of the bowl to near the top of the air horn 38. An adjustment screw 78 can be used for controlling the flow of idling mixture through port 41.

With a carburetor of the above illustrated type, it is desirable to have an auxiliary flow of additional fuel into the throat when the throttle is open sufficiently far to stop the drawing of fuel through the idle passageways. For this purpose FIG. 1 shows a supplementary fuel passageway 80 leading from the body of fuel in the bowl to port 43 and having a jet orifice 81. This passageway is of sufficient height to keep fuel from being sucked through it until the velocity of the air in the air horn is sufficiently large.

Passageway 80 is shown as not having an air bleed, but such an air bleed can be provided if desired. Similarly the air bleeds 66 and/or 74 can be omitted. The air bleeds also serve as anti-siphoning devices where the discharge level of the fuel passageways is below the level of the fuel in bowl 50.

The supply of fuel through the main jet, the idling jet and the auxiliary jet is in such amount as to provide economical air-to-fuel ratios generally ranging between about 14.0 and 14.8 pounds of air per pound of fuel, and this is adequate for most purposes. However, when maximum or near-maximum power is required from the engine, as during acceleration or hill climbing, it is preferred to have an air-to-fuel ratio between about 12.8 and 14.0 pounds of air per pound of fuel, and for this purpose FIG. 1 shows a power fuel supply including a power fuel passageway 82 opening into the carburetor throat at port 44 and connecting with the fuel in the bowl through a power jet orifice 84.

A feature of the present invention is an air bleed 86 opening into passageway 82 and controlled by a plug 88 that is moved into and away from a position closing the air bleed, by means of a temperature-responsive spring 90. A retracting spring 92 urges the plug away from the air bleed closing position and against an arm 94 which is rotated by spring 90 in response to temperature changes.

A tapered needle valve 96 moved against the resistance of spring 104 by manifold vacuum in chamber 98 varies the area of power jet orifice 84 and thus modulates the flow of fuel in accordance with the level of manifold vacuum. When manifold vacuum is above a preset level, e.g. 10 inches of mercury, the needle valve 96 completely closes orifice 84 and prevents power fuel from flowing. As the power requirement increases and manifold vacuum falls below the preset level, spring 104 gradually retracts needle valve 96 until, at full throttle, needle valve 96 is fully retracted and the maximum amount of power fuel flows.

The temperature-responsive spring 90 and retracting spring 92 are arranged so that at very low temperatures, e.g. 0° F., the spring 90 overcomes spring 92 and pushes plug 88 into closing engagement against the open end of air bleed 86. This causes a minimum amount of air to be mixed with the power jet fuel stream so that more fuel is delivered through that stream per unit time. On the other hand, spring 90 is also adjusted so that as the temperature rises from 0° F. to 100° F. for example, that spring becomes weaker and permits retracting spring 92 to gradually retract the plug 88 from the opening of the air vent 86. As this retraction becomes larger more air is bled in with the power jet fuel stream so that less fuel is supplied to the carburetor throat per unit time.

Although the air bleed 86 is illustrated as having its open end directed downwardly, it can be oriented in other directions without changing its basic operation. It is preferably located above the fuel level in bowl 50.

Alternatively temperature-responsive spring 90 and retracting spring 92 may be arranged to push plug 88 into closing engagement against the open end of air bleed 66. This causes a minimum amount of air to be mixed with the main jet fuel stream so that more fuel is delivered through that stream per unit of time when spring 90 is subjected to lower temperature. In this case the mixture enrichment at low temperature is obtained over a wider range of engine operating conditions and can be made larger than that which occurs when the area of air bleed 86 is varied.

The additional fuel supply passage 45 is connected to a pump 110 which is in turn connected to the fuel bowl and arranged to pump out as a single shot a small amount of fuel every time the pump is actuated. Such actuation is provided by an internal spring 112 operating on a piston 114 that pushes a diaphragm 116. Communication with the fuel bowl is through passageway 118, and a ball check 120 permits fuel to flow from the bowl into the pump but prevents flow in the reverse direction. Another check valve 121 permits fuel to be pumped out through passage 45, but keeps the pump's contents from being sucked through that passage when the pump is not operated.

The fuel passage 45 communicates with throat 32 through extra by-pass 46 and orifice 49. The orifice 49 is of such size as to spread the delivery of additional fuel over a period of ½ to 2 seconds, 1 second being preferred.

Injection of the supplementary fuel over the stated period of time by throttling at orifice 49 is particularly desirable for avoiding jerky operation that results from rapid introduction of the fuel as a slug. When the fuel is delivered as a slug, it quickly passes through the engine and momentarily enriches the mixture which otherwise is too lean for combustion. Engine firing which does not occur during most of the deceleration is resumed with such enrichment but quickly stops as the effect of the fuel slug is dissipated inasmuch as the film of liquid on the manifold walls is generally not restored by the slug. The restoration of the film takes place shortly afterward, and engine firing is resumed again.

The successive resumptions and cessations of engine firing cause torque reversals and when all these reversals occur one after the other within one second or less, the operation of an automobile by the engine becomes annoying to the driver and passengers.

When the supplementary fuel is injected over the longer indicated period of time as by throttling at orifice 49, a combustible mixture is maintained from the moment the throttle is opened during deceleration or fuel flow is restored by the deceleration pump while the throttle is still closed. As a consequence the successive torque reversals are minimized or entirely avoided and car operation is smooth.

Alternatively the supplementary fuel from pump 110 may be injected directly into the carburetor throat after passing through orifice 49. In this case, however, a much larger volume of supplemental fuel is required because of the low air velocity in the carburetor throat and the consequent slower arrival of the supplementary fuel in the manifold.

The pump 110 is reset by suction applied to a chamber 122 below the diaphragm through a conduit 124 connected to a slide valve 130. The slide valve is in the form of a tube having three openings 141, 142, 143 in the side wall. A slide 132 is slidable in the tube under the influence of a compression spring 136 and a solenoid plunger 138, and the slide has a cutout 140 sufficient to span across two adjacent openings of the set of three openings 141, 142, 143. Opening 142 is connected to a source of suction by means of a conduit 150. A convenient source of suction for this purpose can be a vacuum booster of the type normally used to operate vacuum-driven windshield wipers when the manifold vacuum is too low. Such a booster can be operated at some convenient suction level such as 13 inches of mercury. A suction reservoir, as in the standard power braking systems, can also be used with or without a booster.

Opening 143 in the slide valve is connected by conduit 152 to a fuel shut-off indicated generally at 160. This fuel shut-off is shown as having a needle valve 162 coacting with the main jet orifice 58 for the purpose of closing the orifice and thereby interrupting the flow of fuel through the main jet. The needle valve 162 is urged towards shut-off position by a spring 164, and a pneumatic chamber 166 including a diaphragm 168 is connected to conduit 152 so that suction applied to that conduit causes the diaphragm to pull needle valve 162 away from the jet-closing position.

Solenoid plunger 138 is under the control of a winding 167 which in turn is actuated by a battery such as the conventional automobile battery 179 and a normally open switch 169. In the illustration, switch 169 has been closed by a pneumatic cylinder 170 operated through suction tube 102. Closing of switch 169 causes the solenoid plunger 138 to be pushed into the illustrated position, moving slide 132 against spring 136, as shown. An increase in pressure in the manifold assembly 23 causes the pneumatic cylinder 170 to release switch 169 so that the switch opens, deactivating the solenoid so that its plunger 138 is retracted and slide 132 is moved to the right by its return spring 136. When so moved, slide 132 has its cutout positioned so as to establish communication between conduit 150 and conduit 152.

The entire control panel 151 has its parts adjusted so that during normal operation of the engine at any position of throttle 34 to develop power, the suction in the manifold assembly 23 is not sufficiently high to cause switch 169 to be closed. The suction line 150 is then connected through slide 132 to fuel shut-off 160, and acts to retract the shut-off needle valve 162 from the main jet orifice 58 so that fuel is available to the manifold assembly. However, when the engine is operated at above 1450 r.p.m. and throttle 34 rapidly closed, as in deceleration of an automobile driven by the engine, the suction of the manifolds will increase to a level sufficiently high, generally about 24 inches of mercury, to cause switch 169 to be closed and the slide 132 to be moved to the illustrated position. Conduit 152 is thereby opened to the surrounding atmosphere as by way of vent 172, so that shut-off needle valve 162 is moved into fuel shut-off position by its actuating spring 164. At the same time the suction reservoir is connected through slide 132 and conduit 124 to pump 110, causing the pump's diaphragm to be pulled down to draw in fuel from the carburetor bowl, and thus prepare for a delivery stroke. When the deceleration is terminated, the suction in the intake manifolds drops off, causing switch 169 to be reopened and slide 132 returned to its right-hand position. This opens conduit 124 to vent 174, permitting the spring 112 in pump 110 to push its diaphragm 116 through a pressure stroke and squirt a small amount of fuel into the air intake system.

Pneumatic cylinder 170 and its associated switch 169 should have hysteresis in their operation. In other words, the vacuum that causes the piston to be sucked over to the left-hand position as shown in FIG. 1, will be higher than the vacuum that permits the piston to be moved back to the right-hand position under the influence of its return spring. Switch 169 will also have some hysteresis. The above hysteresis is desirable since it assures that the supply of supplementary fuel by pump 110 takes place at a manifold pressure higher than that at which fuel cut-off is initiated.

A preferred hysteresis, or difference in manifold pressure between the cutoff of fuel and the injection of supplementary fuel is about 2 inches of mercury although anywhere from 1 to 4 inches will be suitable. In the arrangement illustrated in FIG. 1, most of the hysteresis is supplied by the switch. However, the major portion may be obtained from either the vacuum cylinder or the switch.

The hysteresis can be readily adjusted by varying the frictional drag between the piston and cylinder walls of pneumatic cylinder 170. A similar adjustment can be made in switch 169. Optionally the amount of the hysteresis may be increased by having the piston or switch force a viscous fluid through a throttled passage. A third alternative is use of a flexible diaphragm in lieu of the illustrated piston, the internal friction in flexing furnishing the needed hysteresis.

It should be noted that when the engine is decelerated with the throttle closing delay in operation, the resulting manifold vacuum is further increased to a maximum as the throttle closing delay permits the throttle to move toward the closed position. Vacuum then falls as engine speed decreases.

Pneumatic cylinder 170 and switch 169 are connected so that they operate and cause fuel cutoff in response to a level of vacuum higher than the maximum obtained when deceleration starts at about 1400 r.p.m. The fuel cutoff is then maintained until the manifold vacuum drops to a level slightly below the maximum developed when deceleration begins at 1400 r.p.m. but above that developed during normal idle. This level of vacuum is generally reached just before the deceleration is completed so that the supplemental fuel will then perform its job of making sure the engine begins to fire again.

Throttle valve 34 is shown as completely closed against the walls of the carburetor throat so that no air is permitted to pass between the margins of the throttle valve and the carburetor throat when the throttle is closed. It has been discovered that idle air flow in these marginal spaces cannot be kept in accurate adjustment over long periods of time. The relatively long and very thin crescent-like shapes of such air flow passages are particularly susceptible to variation by the accumulation of deposits, and in addition external mechanical limiting devices are subject to wear that can also greatly vary the spacing.

Idle air in the construction of FIG. 1 is shown as supplied through a hole 48 that can be drilled through the valve 34, and the passageway provided by such a hole is much less susceptible to variation in effective air flow. Where idle air flow is to be made adjustable, as for example to compensate for variations in barometric pressure, different throttle valves having differently sized holes 48 can be used, or as illustrated by a by-pass 46 can be provided and can include a metered plug 47 which can be made replaceable by other plugs of different sizes or can even be equipped with a needle valve of the adjusting type similar to adjustment screw 78.

Throttle valve 34 is also arranged so that it cannot be abruptly moved into its fully closed position. For this purpose a stop arm 180 secured to the throttle valve 34 cooperates with a dash-pot 182 having a plunger 184 positioned for engagement by the stop arm as it approaches the fully closed position. The plunger 184 is secured to a diaphragm 186 that defines an air cushion zone 188 vented by a small opening 190. A spring 192 inside the dash-pot urges the plunger outwardly to engage the stop arm, but is not strong enough to overcome the throttle-closing forces. The throttle will then move to its fully closed position only as fast as the air in cushion 188 is permitted to vent through opening 190. A few seconds is thus required for the last few degrees of throttle closure. The return of the plunger 184 by its spring 192 when the throttle is opened, can be made much more rapid and is preferably completed in about a second or less so as to be prepared for another deceleration when it will introduce another appropriate delay. This helps assure a minimum of undesired emission products.

FIG. 1 shows opening 190 to be incorporated in a check valve disc 191 biased as by a spring against a stop that restricts outflow of air to that opening, but permits inflow of air around the disc. This will provide the more rapid return of plunger 184.

Figure 3:
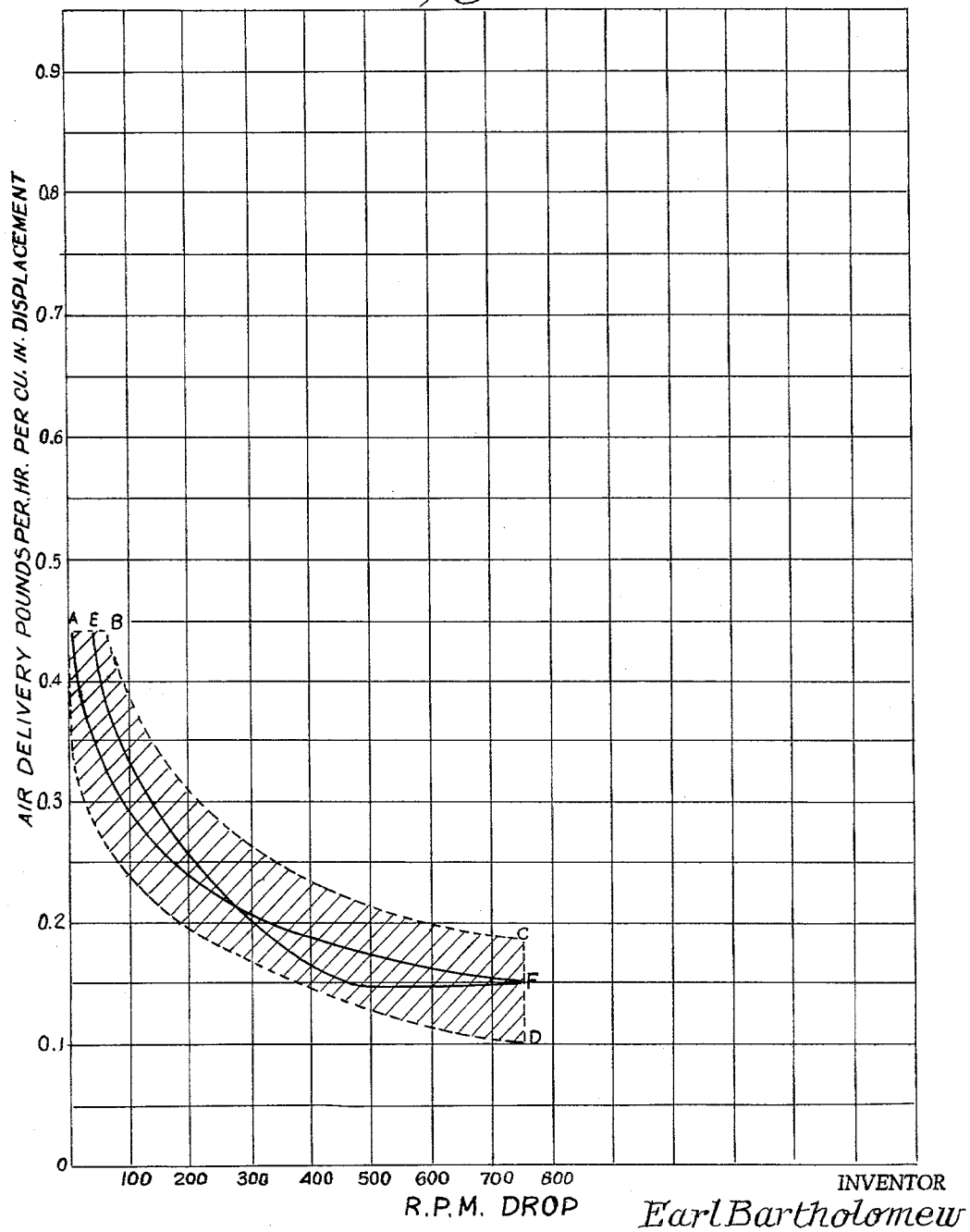
FIG. 3 is a curve diagram illustrating one manner of engine operation typical of the present invention.

Without the throttle closing delay the movement of air through the carburetor throat would drop very abruptly when the throttle control mechanism is abruptly brought to the closed position. With the delay, however, the air delivery tapers off somewhat. FIG. 3 is a generalized graphical illustration of what happens, the air delivery rate being represented by the ordinate scale, the abscissa scale representing the drop of engine r.p.m. from that at which the throttle control mechanism is abruptly brought to the closed position. The hatched area bounded by the straight line AB, the curved line BC, the straight line CD and the curved line DA, represents a desirable range for the relationship between the r.p.m. drop and the air delivery rate. For example where the air delivery rate at engine idle is about 0.15 pound per hour per cubic inch displacement, abrupt closure of the throttle control mechanism, as by abrupt lifting of the foot from a throttle pedal, when the engine is operating at 1400 r.p.m. with the air delivery rate of 0.44 pound per hour per cubic inch displacement, the throttle delay will preferably cause the air delivery rate to trace the full line curve AF in FIG. 3. This would correspond to a usual form of deceleration from about 30 to about 15 miles an hour of an automobile having such engine coupled with a manual transmission.

When the engine deceleration is such as accompanies an automobile deceleration of from 50 to 20 miles an hour, the air delivery rate preferably traces the curve shown by the full line EF. The particular manner by which the air delivery rate reaches point E from the running rate which may be as high as 0.8 of a pound per hour per cubic inch displacement, is not significant. However, with the above throttle-closing delay the travel from the running air delivery rate to point E will be substantially a straight line.

FIG. 2 shows more of the carburetion structure. In this figure carburetor throat 32 is illustrated as one of two carburetor throats operated in parallel. The second carburetor throat is shown at 232 and has a diameter about 1½ times that of throat 32. Also as shown in FIG. 2, manifold 21 is connected to throat 32 while manifold 22 is connected to throat 232. Fuel is supplied to throat 232 through a separate metered orifice (not shown) and throat 232 is also provided with a venturi 236, a throttle valve 234, and can have a choke valve 240. No provision for idle air flow is allowed in throat 232, and throttle 234 accordingly closes directly against the walls of the throat. Also there is no idle fuel discharge into throat 232. Because throat 232 is only used over a very small range of engine operating conditions, a single fuel supply is all it needs to provide the proper air-to-fuel mixtures. Both throats can accordingly be very easily combined with a single bowl 50, as illustrated in FIG. 2.

For ease of illustration, throttle 34 is shown as viewed from the same relative location in FIGS. 1 and 2, although they should be at right angles.

The two carburetor throttle valves 34 and 234 are controlled by a throttle interlinkage of the type described in parent application Serial No. 171,856 filed February 8, 1962, and the subject matter of that application is incorporated herein as though fully set out herewith.

The interlinkage includes a pair of crank arms 241, 242 fixed onto shafts 244, 245 which carry the respective throttle valves 34, 234, so that the crank arms turn with their respective throttle valves. Pivoted for rotation about the respective shafts are discs 212, 217 having ears 251, 252 that together with fixed stops limit the rotation of the discs. A low stop 254 defines the limit of travel of disc 212 in the throttle closing direction, and a high stop 255 limits its movement in the throttle opening direction. Similar low and high stops 256, 257 limit the travel of disc 217.

Crank arm 241 is urged to rotate with its disc 212 by means of a tension spring 260 that engages the arm at 261 and the disc at 262, and pulls the arm toward a rest position against pin 265 on the disc. On the other hand, arm 242 is restrained against moving with disc 217 by a tension spring 270 that engages the arm at 271 and a pin 272 fixed to the carburetor body. A cutout 274 in disc 217 allows for the positioning of spring 270 and pin 272.

Actuators shown as suction cylinders 281, 282 are arranged to positively connect the respective discs to their crank arms, and to overcome the tension springs 260, 270. Cylinder 281 has a piston rod 283 that is pivoted to crank arm 241 at 284, while the cylinder itself is pivoted to disc 212 at 288. A flexible suction line 289 connects the interior of the suction cylinder to a control panel 351.

Suction cylinder 282 is similarly pivoted to disc 217 and has a piston rod 285 pivoted to arm 242 at 286, as well as a flexible suction line 290.

Manipulation of the throttles is effected by a rod 292 one end of which 294 is connected to the throttle control such as the accelerator pedal of an automobile in which the engine is mounted. The rod 292 passes loosely through a boss 296 which in turn has a projecting stud 298 that is pivotally received in disc 212. Rod 292 also passes loosely through another boss 300 similarly pivoted as by stud 302 to disc 217.

A flange 304 is fixed to rod 292 for engaging boss 300. Engagement with boss 296 is provided by a washer 306 loosely mounted on rod 292 and urged toward boss 296 by a compression spring 308 backed against a suitable enlargement such as end 294. Both discs are biased toward their low stops by tension springss 310, 311 respectively. A normally open electrical switch 314 is also positioned for closing by a pin 316 carried by disc 212 when that disc is turned against its high stop. This switch 314 is part of the throttle control generally indicated at 351 and is connected in series with a winding of solenoid 366, the contacts of a normally open switch 368, and the winding of a holding relay 358. A battery 379 which can be the same as battery 179 will accordingly energize solenoid 366 when both switches 314 and 368 are closed. Holding relay 358 has contacts 382 which are in parallel with the contacts of switch 368 so that once the solenoid 366 is energized it will remain energized even if switch 368 is subsequently opened, so long as switch 314 remains closed. Switch 368 is actuated by a pneumatic cylinder 370 which in turn can have a suction connection to line 102 as illustrated. Solenoid 366 actuates a slide valve 330 having a slide 332 biased towards the illustrated position by a compression spring 336. One wall of the slide valve has a pair of openings 341, 342, and the slide 332 has a cutout 340 which is large enough to span across these openings. Opening 341 is connected to a source of suction as by means of the line 150 described in connection with FIG. 1. Opening 342 is connected to flexible suction line 290 for suction cylinder 282, as well as to flexible suction line 289 for suction cylinder 281.

Cylinder 281 is preferably made to respond to suction more slowly than cylinder 282. For example, in FIG. 2 cylinder 281 has the chamber opposite the suction-receiving one provided with a small vent 275 that admits air when suction is applied by line 289. Just outside this vent is a flexible flapper vane 276. This vane is pulled toward covering engagement with the vent when piston rod 283 is moved downwardly by the suction, and so slows down the actuation of the piston rod to provide some overlap in the shifting from the manifold of smaller cross-section to the manifold of larger cross-section. The large carburetor accordingly begins supplying fuel to the engine somewhat before the small carburetor terminates its fuel supply. About one second of overlap has been found desirable to help make this shift-over smooth. Switching from the large carburetor to the small carburetor is not significantly helped by an overlap. In the illustrated embodiment, the vane 276 acts as a one-way valve that more freely permits escape of air from the cylinder when the piston is pulled upwardly. Without such valve, the opening of the small throttle would be delayed some after the large throttle is closed, and shifting back to the manifold of smaller cross-section at any speed above idle would involve a short drop in power.

Another very helpful expedient in smoothing the shift from the manifold of smaller cross-section to that of larger cross-section, is the supplying of a momentary amount of additional fuel to the large carburetor throat 232. In FIG. 2 this supplemental fuel supply is shown in the form of an additional diaphragm pump 410 with an intake 419 opening into the liquid 52 (see FIG. 1) in the carburetor bowl, and a discharge line 445 running into throat 232. A ball check 420 in the intake, and another check 421 in the discharge make sure the liquid is pumped properly and yet not permitted to be sucked into throat 232 when the pump is not operated.

Pump 410 has a diaphragm 416 secured to an impeller 414 held by a rod 430 that also carries a piston 432. A pneumatic cylinder 434 is provided above piston 432 by a fixed partition 436 through an aperture in which piston rod 430 slidably penetrates. A vent 433 is in the cylinder below the piston, and a spring 438 in the cylinder urges the piston downwardly so that the pump is in position for a pumping stroke. A suction line 440 connects the cylinder with suction opening 342 in the control assembly 351.

When the control assembly operates to effect the shift-over from the manifold of smaller cross-section to that of larger cross-section, suction is applied to opening 342, and through line 440 to the pneumatic cylinder 434 of pump 410. This causes the pump piston 432 to be lifted against its spring 438, squirting a single charge of fuel into throat 232. No more fuel flows through pump 410 so long as the engine remains shifted to the manifold of larger cross-section. When there is a return shift from that manifold to the one of smaller cross-section, the pump's pneumatic cylinder is vented by slide valve 330, and the piston 432 pushed down by its spring 438. This draws replenishing fuel from the carburetor bowl through intake 419, and the pump is then prepared for the next pumping stroke.

A single charge of about ½ milliliter of fuel per 100 cubic inches of engine displacement, made at the shift-over from the manifold of smaller cross-section to that of larger cross-section has been found to make it a particularly smooth shift even when the engine is under heavy load, without detracting significantly from the efficiency of the engine and without detectably increasing its emission of unburnt and partially burnt fuel as well as of carbon monoxide. However, as much as 1 milliliter can be used per 100 cubic inches of engine displacement with very good results, and as little as ⅛ milliliter per 100 cubic inches will give detectable improvement, although no extra fuel whatever is needed to make the engine perform adequately.

The manifold shift-over is also arranged to avoid hunting. When the shift is made from the manifold of smaller cross-section to that of larger cross-section, the manifold pressure tends to drop, so that the cylinder 370 may permit switch 368 to open. However, the shift-over is accompanied by closing of lock-in contacts 382 which are in parallel with switch 368, so that the shift-over remains completed and there is no tendency to shift back so long as switch 314 is in closed condition. This arrangement also avoids hunting when the shift-over is made in the opposite direction.

A feature of the above construction is that it enables engine operation with exceedingly good fuel distribution to the various cylinders and each cylinder is accordingly supplied with optimum air-to-fuel ratios, thereby producing the minimum amount of unburnt or partially burnt fuel as well as very little carbon monoxide. Moreover, the operation under deceleration conditions where the greatest amount of unburnt and partially burnt fuel is generally evolved, is such that this evolution is so sharply curtailed as to be more favorable than heretofore considered practical. Even warm-up operation of the engines in accordance with the invention, at very cold temperatures, is much more efficient and evolves less of the above undesired products.

Considering the engine operation in detail, idling and general low power operations are carried out with various positions of throttle 34, but with throttle 234 closed. Because of the very rapid flow of induction mixture through the manifold of smaller cross-section under these conditions, the fuel is very thoroughly mixed with the air and very evenly distributed to the individual cylinders. Relatively high boiling ingredients in the fuel such as tetraethyllead, and very low boiling ingredients such as pentane, are conducted to the individual cylinders in substantially identical proportions to each cylinder. For these results the small carburetor should have a cross-sectional area at the throttle from about ¼ to about ⅝ square inches per hundred cubic inches of displacement. A preferred figure is about ⅜ square inches for every 100 cubic inches of displacement.

When the engine is called upon to deliver more power than it can readily provide through the manifold of smaller cross-section, as for example when the throttle controls are open at least to the position required to hold the small throttle open and the manifold vacuum is greater than about 2 inches of mercury, the engine is automatically shifted under these conditions to the manifold of larger cross-section. The cross-section of the larger manifold is advantageously between about ¾ and 1½ square inches for every 100 cubic inches of engine displacement, and preferably one square inch for every 100 cubic inches of engine displacement. Under the influence of the above-described shift-over mechanism, cylinder 370 closes switch 368 and this combined with the closing of switch 314 causes solenoid 366 to be energized, moving slide 332 towards the right, as seen in FIG. 2. Suction is accordingly applied to suction cylinder 282, causing it to open throttle 234 to a degree determined by the position of the throttle control. Suction is also applied to suction cylinder 281, causing it to close throttle 34. A slight delay in such closing helps to more smoothly transfer such engine operation from the small manifold to the large manifold, but this smoothness is not at all essential, and if desired there need be no overlap whatever. After the shift-over to the large manifold, the engine will continue to operate in such shifted condition through throttle movements that open the large throttle more or less so long as the throttle control is sufficiently open to hold the small throttle control disc 212 against its high limit.

When disc 212 is pulled away from its high limit by further closing movement of the throttle control, switch 314 is opened and the suction chambers of both cylinders 281 and 282 are vented, thus causing throttle 234 to be closed by its spring 270, also causing throttle 34 to be opened by spring 260 to the degree determined by the position of its disc 212.

Under deceleration conditions, the principal operation is with the manifold of smaller cross-section, and here the combination of the throttle closing delay, and when appropriate the shutting off of fuel, have been found to provide exceedingly low emission of carbon monoxide and of unburnt or partially burnt fuel. The preferred fuel shut-off takes place if the deceleration begins at engine speeds greater than about 1450 r.p.m. Moreover, the pumping of a small amount of supplementary fuel when the main fuel flow is restored, combines with the other features to give the desired results. About 0.15 milliliter of supplementary fuel pumped in for each 100 cubic inches of engine displacement is preferred when the pumping is into the idle air passageway.

It is sufficient for the fuel shut-off to merely stop the flow of fuel into the main and idle jets. During deceleration there is substantially no fuel moving through the power jet 84 or through the enrichment jet 81. Similarly, no special precaution need be taken with the large carburetor throat 232 inasmuch as its throttle will be closed during deceleration.

When an engine is first started under very cold temperature conditions, extra rich mixtures are needed to have proper combustion in the engine cylinders because of the incomplete evaporation of the fuel. Due to the thorough and even distribution provided by the induction system of the present invention, this enrichment need be no higher than corresponds to about 11.6 pounds of air for every pound of fuel at 0° F. Indeed, it can be as low as 12 pounds of air for every pound of fuel at that temperature. Such power enrichment is not needed for operation through the manifold of larger cross-section since the mixture supplied by the large carburetor throat can be made rich enough, e.g. between 11 and 11.5 pounds of air per pound of fuel, so that no supplemental enrichment is required.

For maximum economy the fuel mixture supplied to the large carburetor throat can be leaned down for operation at normal temperatures, and extra enrichment provided for very low temperature operation. This type of enrichment can be controlled by a bimetallic spring like spring 90, and one spring of this type can be used to control the enrichment for both carburetor throats.

As the engine, fed through the small induction system, is warmed up with relatively high output from the foregoing cold condition, the power-enriching fuel is mixed with more and more bleed air by opening of plug 88, at all times operating with relatively low undesirable emission.

The induction system of the present invention can have either an automatic choke or a manual choke. Choking can be reduced to a minimum and automatic chokes that only operate for about two minutes with a 0° F. start are adequate.

The present invention permits the primary intake system to be designed specifically for relatively high velocity of flow over the lower range of mixture flow requirements without sacrifice of engine performance when the larger volumes of mixture are required. Similarly, the secondary fuel intake system can be tailored to meet high-volume demands without incurring the low-speed problems associated with conventional systems.

Figure 4:
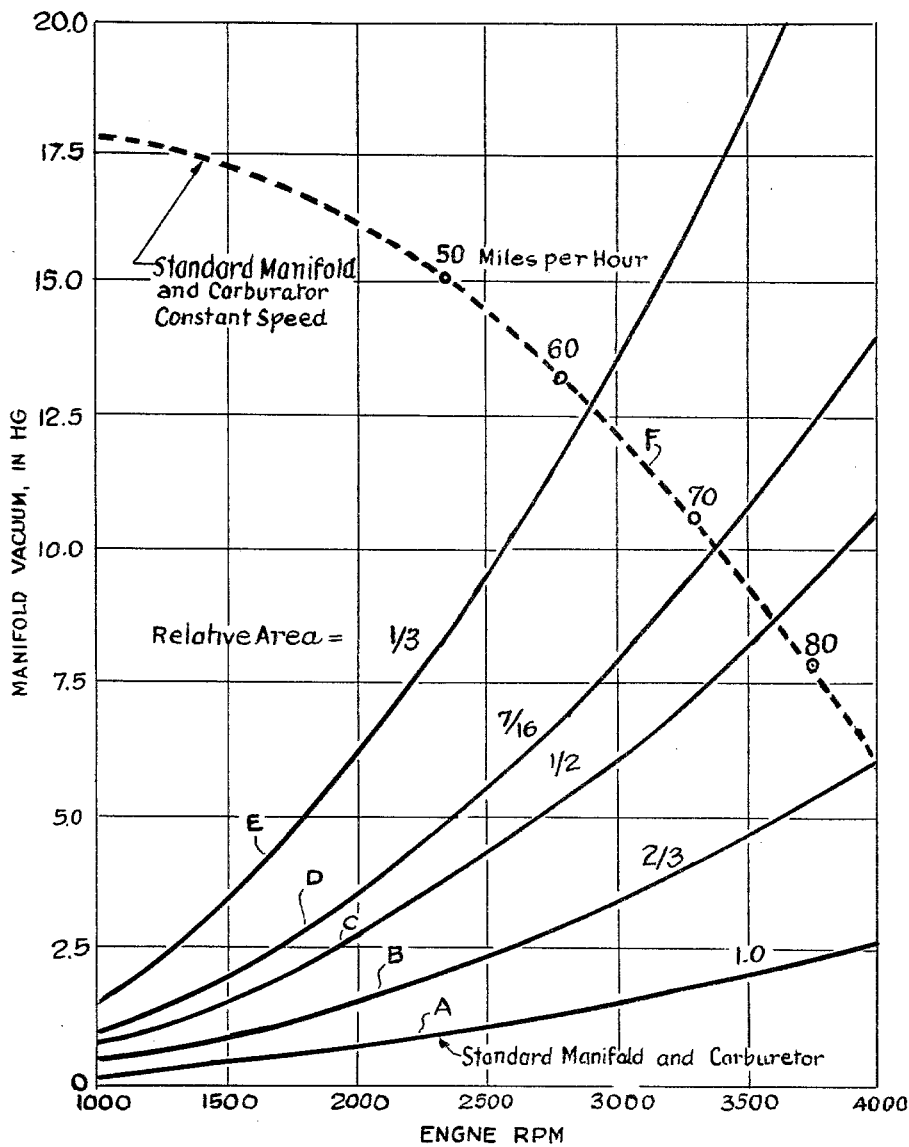
FIG. 4 is a graphical showing of the relationship between manifold vacuum and speed for an automobile having an all-mechanical transmission.

In FIG. 4 the vertical scale is manifold vacuum in inches of mercury and the horizontal scale is engine speed expressed as revolutions per minute. Curve A of FIG. 4 shows the variation in manifold vacuum with engine speed at full throttle for a current four-cylinder automobile equipped with a manual transmission. The displacement of the engine is about 195 cubic inches and the cross-sectional area of each branch of the standard manifold at the intake port is approximately two square inches. Curves B, C, D and E of FIG. 4 indicate the calculated variation of manifold vacuum at full throttle with engine speed for fuel-induction systems of this engine whose cross-sectional areas at all points are $\frac{2}{3}$, $\frac{1}{2}$, $\frac{7}{16}$ and $\frac{1}{3}$, respectively, of the cross-sectional areas of the standard intake manifold and carburetor venturi. Curve F of FIG. 4 shows, for constant car speeds on level road, the manifold vacuum at any engine speed for the standard induction system. Points shown on Curve F indicate the manifold vacuum and engine speed at constant car speeds of 50, 60, 70 and 80 miles per hour on level road.

FIG. 4 indicates that for this particular vehicle a small manifold and carburetor having about $\frac{7}{16}$ of the area of the standard manifold and carburetor venturi can provide adequate amounts of mixture up to just above 70 miles per hour under constant speed conditions. At higher vehicle cruising speeds the resistance to flow through such a system would be too high to permit the required volume of flow. For example, at 80 miles per hour corresponding to 3750 engine r.p.m., Curve F shows that the required manifold vacuum is about 7.8 inches of mercury whereas Curve D indicates that an induction system having $\frac{7}{16}$ the cross-sectional area of the standard system would produce vacuum of about 12.3 inches of mercury at 3750 r.p.m.

Under cruising conditions at about 3400 r.p.m., corresponding to a little more than 70 miles per hour, the secondary intake system is brought into operation and mixture flow through the primary intake system is stopped. If preferred, the larger system may be brought into operation at a lower speed. When the cross-sectional area of a primary intake system has been chosen for a given engine, the maximum cruising speed obtainable with the primary system is established. Accordingly, the larger secondary system is brought into operation at or below this limiting speed.

It is possible to operate the vehicle at all speeds below the above maximum using the primary intake system. However, under some low-speed conditions, the area of the primary system may become limiting and the desired level of performance cannot be obtained. For example, since power produced at full throttle decreases with an increase in manifold vacuum, it is ordinarily preferred that manifold vacuum not exceed about 2 inches of mercury at 1500 r.p.m. when the throttle pedal is fully depressed. At manifold vacuums much higher than this value, the vehicle could not be accelerated at the desired rate. Because of the more nearly uniform distribution of fuel to the cylinders by the primary intake system, acceleration at full throttle up to about 1500 r.p.m. is usually as rapid as with the standard system even though the manifold vacuum produced by the latter is somewhat lower. However, at higher engine speeds the accelerative ability of the car operating with the primary carburetor at full throttle is less than during operation with the secondary carburetor at full throttle. Thus, when maximum torque is needed, mixture flow is transferred from the primary to the secondary system at or prior to the speed where the area of the primary system becomes limiting with respect to the desired level of performance. Under other engine operation conditions, it is preferred that transfer occur only when the small throttle is fully opened and the manifold vacuum exceeds about 2 inches of mercury. Thus at all conditions up to about 1500 r.p.m., the fuel-air mixture is delivered to the cylinders solely through the primary intake system regardless of manifold vacuum. At speeds from about 1500 r.p.m. to the previously set upper limit (say about 70 m.p.h.) the primary system is in operation under all conditions except that combination with respect to the primary system of full throttle and manifold vacuum greater than 2 inches of mercury. Under the latter condition and under all conditions above about 70 m.p.h., the fuel-air mixture is delivered to the cylinders solely through the secondary intake system, and the primary system is inoperative.

With the afore-described vehicle, the cross-sectional area of each branch of the large manifold at the intake port was about 2 square inches. The small intake system had a manifold with a cross-sectional area of about 0.8 square inch at each intake port. Thus the ratio of the area of the secondary system to the smaller primary system was about 2.5:1. Operating this vehicle in accordance with the method of this invention provides benefits in terms of reduced maldistribution of fuel constituents, reduced emissions in the exhaust stream and increased fuel economy even without the throttle-closing delay, fuel cutoff, deceleration fuel pump and fully closing throttle. Other manifold vacuum and primary throttle positions can also be used to effect shift-over to, or opening of, the secondary throttle.

Another feature of the present invention is that because of the relatively rapid flow of induction mixture through the manifolds at all times, there is no need for the usual acceleration pump. Such a pump adds more fuel to the induction mixture each time the throttle control is opened, and this is extremely wasteful of fuel. Moreover, the additional fuel tends to increase the carbon monoxide emission of the engine.

When an automatic choke is used, it can be operated from the same temperature-responsive spring used to control the air bleed to the power enrichment jet. Similarly, the pneumatic cylinders 170 and 370 can be combined into a single cylinder as by providing it with two springs of different stiffness to cause it to compress the less stiff spring first and the more stiff spring next, as the manifold suction increases. The switch that is closed when the first spring is compressed can be yieldably mounted so as not to interfere with the further movement of the cylinder to close the second switch.

Other portions of the illustrated structure can have their functions combined. For example, the pump 110 and its associated parts can be arranged to also operate as a supplementary enrichment device so that the fuel passageway 80 can be eliminated. Passage 45 would then open directly into the air horn or venturi, rather than into the idle air-supply by-pass. To permit the desired fuel flow check valve 121 can be eliminated, or its seating pressure reduced to such a degree that the flow of air through the air horn 38 will develop sufficient suction to suck fuel from the carburetor bowl through the pump 110. Where the check valve 121 is retained and such dual operation is desired, the low seating pressure of this valve can be obtained as by merely using the weight of the valve element itself, and the valve closing spring shown can then be eliminated. Positioning the valve passageway so that it runs vertically with the discharge running up provides the maximum effect of gravity.

The intake valve 120 of pump 110 is also in the path of the fuel flow through the pump. No spring is shown in this valve inasmuch as it is not necessary, particularly if the pump is to have the foregoing dual function. A retaining pin 123 merely keeps the valve element 120 from being pushed into the pump. Also the horizontal orientation of the pump's intake passageway keeps the intake valve from significantly impeding the flow of fuel in the desired direction. The intake valve can alternatively be oriented so that the fuel flow through it is vertically downward, or in any other direction. The vertical downward direction is preferred.

For the dual purpose operation the metering orifice 49 in the discharge line of the deceleration pump can be eliminated or replaced by metering built into either or both of the check valves instead.

A snap action is preferred for the fuel shut-off as well as for the manifold switch-over and the above described controls have such snap. Similar snap actions can also be obtained by directly using the electrical circuits of these controls to operate an electric fuel shut-off solenoid and electric throttle switching solenoids. A relatively large manifold-pressure responsive cylinder would be called for to directly actuate the fuel shut-off and the switch-over with a snap, because of the small manifold vacuum involved. A small cylinder can however be used to trigger the application of suction from a vacuum reservoir, or trigger direct electrical operation by solenoids.

Instead of having the manifold shift-over effected by operation of the throttles 34 and 234, an auxiliary set of valves similar to the throttle valves can be inserted in each carburetor throat and/or manifold. The auxiliary valves can then be operated by control panel 351 without disturbing the throttles. The shift-over operation can also be carried out by electrical actuation of the valves along the lines described in parent application Serial No. 171,856, now Patent No. 3,171,395, rather than by pneumatic actuation.

The flow of idle air through the small carburetor can also be controlled, as by having all such idle air arranged to be supplied through a by-pass like 46, with a shut-off valve in the by-pass connected to be automatically closed when no idle air is wanted. The throttle 34 will then have no opening 48 and no other arrangement for idle air to get past it.

Not much is gained by shutting off such idle air movement through small carburetor throat 32 when the engine is operating through the large carburetor throat 232. However, during deceleration it is helpful to shut off all idle air whenever the fuel is shut off. With such simultaneous shut-off of fuel and air, the advantage of a throttle-closing delay is minimized and such delay can be entirely eliminated. Without the throttle-closing delay, the fuel shut-off is preferably made as complete as possible, as by having the shut-off in the idle fuel passageway 68 close to where it opens into throat 32, and preferably in the passageway section between air bleed 74 and transfer port 72. Without a shut-off in this location the fuel always found in this section as the throttle 34 is closing, will be sucked into the manifold assembly even though a shut-off is effected at 60. The idle fuel shut-off can be combined with the shut-off at 60, or can be used by itself without a shut-off at 60. Where no throttle-closing delay is used, the shut-off at 60 is not even needed, particularly if all air flow to the engine is shut off by closing of the throttle 34, inasmuch as abrupt decelerations promptly close this throttle and thus prevent fuel delivery through the main jet.

The effect of combining a throttle-closing delay with fuel cut-off at decelerations from speeds of about 1400 r.p.m. or lower, is to increase the emission at the exhaust of unburned and partially burned fuel, as compared with carrying out such decelerations with a throttle-closing-delay alone. At about 1450 r.p.m., decelerations begin to show favorable results with fuel cut-off. When in an automobile decelerating in a downgrade, the fuel cut-off takes place with decelerations that start from 1500 or more r.p.m. if the control is adjusted to provide fuel cut-off at about 1450 r.p.m. during level-road deceleration.

Where the effects of a throttle-closing delay are desired, they can be obtained by providing a by-pass for fuel and air to move from the upstream side of the throttle 34 to the downstream side. The throttle can then be abruptly closed, and a temporary opening of such a by-pass will provide the extra fuel and air otherwise made available by a throttle-closing delay.

The change-over from a manifold of one cross-section to another of larger cross-section can also be accomplished with a single manifold that is made so as to have a shiftable cross-section. For example a manifold can be made with readily deformable walls, or a rigid outside wall can have an inflatable internal conduit running lengthwise of it. Shiftover to the smaller cross-section is then accomplished by physically squeezing the deformable walls or inflating the internal conduit.

It is a further feature of the present invention that idle operation can be obtained with very lean air-to-fuel mixtures. This is essentially attributable to the use of a relatively small cross-section for the manifold. An idle mixture of 14.0 pounds of air per pound of fuel can thus be used with important advantages in the accompanying low level of undesired exhaust emissions.

In addition the use of the full-closing throttle valve so as to avoid the long crescent-shaped idle air passageways, keeps the idle air flow from being rapidly changed through accumulation of deposits, etc., so that the lean idle will not be as prone to gradual enrichment. This also reduces the frequency of tune-ups that may be required to assure proper operation. Moreover, the idle air passageways of the present invention can be arranged so that they are not adjustable, and this minimizes the possibility of having them set improperly during servicing. The idle air passages of the present invention can also be in the form of a plurality of holes in the throttle valve 34. These holes can be located away from its edges, or if only about two such holes are provided they can be notches in the edge. Each such notch should extend only a limited length along the edge, as for example not over about 75°. This, coupled with the seating against the carburetor throat in closed position, enables good trouble-free operation.

Elimination of the temperature modulation for the power jet air bleed as well as of the enrichment through passageway 80 will not detract significantly from the desirable results obtained by the construction of the present invention. Elimination of deceleration pump 110 will have an effect on deceleration operation, but even without this pump the engine will more than pass standard anti-smog standards.

The use of a single manifold in place of the dual manifolds will sharply reduce the improvements, but will still provide important advantages apparently not obtainable in any other way.

The above considerations apply particularly to engines used in automobiles equipped with manual, that is all-mechanical transmissions. These are the worst offenders with respect to undesired exhaust emissions. When used with automatic transmissions or fluid drive couplings, a very similar low level of emissions is obtained by means of the present invention, although the advantages are not quite as striking because without the present invention the level of emissions is somewhat lower than with all-mechanical transmissions.

With fluid couplings the engine decelerates more rapidly and during deceleration is not driven as much by the automobile's momentum. Moreover gear shifting is accomplished automatically without throttle closure. Accordingly throttle-closing delay is not as beneficial in reducing emission. However, devices which cause throttle-closing delay are generally used with fluid couplings in order to help assure that the engine does not die when the throttle is closed abruptly. The devices are designed and adjusted to accomplish this objective. Because of the variation in the tendency of car engines to die after abrupt throttle closure, the duration of the delay and the angle of throttle movement involved cover a considerable range. The throttle-closing check of the present invention preferably produces the variation in air flow during deceleration that is indicated in FIG. 3. This type of delay device also keeps the engine from dying when its throttle is closed abruptly and it is fluid-coupled to a transmission. It should be noted that the throttle-closing delay of the present invention is principally for use when decelerations are begun from significant speeds such as 1100 or more r.p.m. or at least about 12 miles per hour, and such delay can be arranged not to take place at lower speeds. This modification will also save fuel, provide better engine braking at low speeds, and simplify forward and backward movements such as those involved in parking automobiles in cramped spaces.

To effect the elimination of throttle-closing delay at lower speeds, it is convenient to have a pneumatic type snubber as in FIG. 1, with a speed-responsive device connected to vent the pneumatic chamber when the engine or automobile speeds are sufficiently low. FIG. 5 illustrates one such construction.

In this figure there is only shown a snubber 482 similar to that of FIG. 1, but having a mushroom-shaped valve member 491 with an elongated shank 493. Around this shank is fitted a solenoid winding 495 connected to a switch 497 that is mounted for operation by centrifugal weight or governor type elements rotated by the distributor or speedometer shaft. The weight elements are adjusted so that switch 497 connects winding 495 to the automobile's battery when the engine speed is at about 1100 r.p.m. or less or the automobile speed is about 12 miles per hour or less, and at higher speeds the switch breaks that connection. The shank 493 is arranged to be drawn down to compress its spring 489 when winding 495 is energized. In the illustrated construction shank 493 is made of relatively non-magnetic material and to its outer end is shrunk or cemented a highly magnetic sleeve 499.

Other techniques can also be used for avoiding throttle-closing delay at the foregoing low speeds. Venting of a pneumatic snubber can be made to by-pass its principal valve, and switching can be actuated by the voltage changes of the automobile's generator.

The total emission of unburned or partially burned hydrocarbons as well as of CO is even lower with the engine using the throttle-closing delay modification of FIG. 5 than with that of FIG. 1. Moreover, the construction of FIG. 5 shows about half of the braking loss caused by ordinary throttle-closing delays when decelerating from about 40 miles per hour or less.

The modification of FIG. 5 need not take the engine response out of the area ABCD of FIG. 3. It will, however, bring the operation down to the lowermost portion of the area, or even below it, for decelerations from speeds up to about 1450 r.p.m. Decelerations from higher speeds are not appreciably affected by the 1100 r.p.m. or 12 miles per hour venting, and engine decelerations from these higher speeds can be well within area ABCD at all r.p.m. drops.

According to the present invention the combination of throttle-closing delay for higher speeds and no throttle-closing delay for speed below about 1100 r.p.m. or 12 miles per hour, can be used without the other features to provide the advantages in fuel economy, braking and parking. The combination can also include the fuel shut-off for decelerations from 1450 or more r.p.m. or any other feature or group of features to reduce the undesired emission.

Obviously many modifications and variations of the present invention are possible in the light of the above teachings. It is, therefore, to be understood that within the scope of the appended claims the invention may be practiced otherwise than as specifically described. For instance, instead of having the two carburetor throats operate from a single carburetor bowl, two entirely separate carburetors can be provided, each with its own bowl. Moreover, the fuel can be supplied to the engine by injection directly into the manifolds and still take advantage of the desirable features of the present invention. In addition the throttle closing delay need not be pneumatic but can be operated in other ways. It can, for example, be hydraulic as in a shock absorber type of delay, or mechanical as in a gear train type of delay used in spring motors for music boxes. A hydraulic delay can be equipped with a relief valve operated to eliminate the delay when the speed reaches or is at 1100 r.p.m. or 12 miles per hour. A gear train can be arranged to be automatically disconnected at those speeds.

What is claimed:

1. A gasoline engine having gasoline supply means for delivering gasoline to at least one cylinder, air supply means including a throttle control for delivering air along with the gasoline to provide an explosive mixture, both of said means being connected for limiting the reduction of air delivery when the throttle control is abruptly closed so that the relationship between the air delivery rate and the engine r.p.m. drop falls within the area ABCD of FIG. 3, both of said means being further connected to essentially shut off the delivery of gasoline as the throttle control is abruptly closed if at that time the engine is running at more than 1450 r.p.m. and to maintain the delivery of gasoline as the throttle control is abruptly closed if at that time the engine is running at a speed of no more than 1450 r.p.m.

2. The combination of claim 1 in which a pair of parallel intake manifolds separately connect each engine cylinder to both the gasoline supply means and the air supply means, one of the manifolds having an effective cross-sectional area substantially larger than that of the other and both the gasoline supply means and the air supply means are connected to deliver gasoline and air only through the manifold of smaller cross-section when such delivery does not significantly limit the power output.

3. The combination of claim 2 in which the gasoline supply means and the air supply means are further connected to deliver gasoline and air essentially only through the manifold of larger cross-section when at any engine speed the engine is called upon to deliver more power than it can with the manifold of smaller cross-section.

4. A carburetion apparatus having a liquid fuel bowl, a supply conduit including a venturi, a throttle valve in said conduit and connected to seat against the conduit walls to provide a non-adjustable limit against which the valve rests whenever the throttle is closed, by-pass elements connected to by-pass an idle air flow stream from one side of the valve to the other when the valve is so seated, fuel control elements connected to (a) control the flow of fuel from the bowl to the supply conduit, (b) shut off such flow when downstream of the throttle valve there is an increase in vacuum substantially above idle vacuum, and (c) supply an extra amount of fuel to the supply conduit when such shut-off is terminated, and throttle-closing-delay means connected to prevent the throttle from closing abruptly.

5. The combination of claim 4 in which there is a power fuel supply mechanism connected to deliver fuel from the bowl to the supply conduit to supply maximum power demand from the carburetion apparatus, and the power fuel supply is temperature compensated to supply more fuel at lower ambient temperatures than at higher ambient temperatures.

6. The combination of claim 4 in which there is a second supply conduit parallel to and having a cross-sectional area substantially larger than that of the first such conduit.

7. The combination of claim 5 in which there is a second supply conduit parallel to and having a cross-sectional area substantially larger than that of the first such conduit.

8. The combination of claim 6 in which the second supply conduit has no provision for an idle air flow, and no provision for an idle fuel flow.

9. The combination of claim 7 in which the second supply conduit has no provision for an idle air flow, and no provision for an idle fuel flow.

10. The combination of claim 9 in which the second supply conduit has no provision for a power fuel flow.

11. The combination of claim 6 in which the second supply conduit has its own throttle valve, and a selector mechanism is connected to essentially keep both throttles from being simultaneously open.

12. A gasoline engine induction system having an intake manifold and a carburetor, the carburetor including a liquid fuel bowl, an air supply conduit including a venturi connected to receive air and fuel and deliver them to the manifold, a throttle valve in said conduit and connected to seat against the conduit walls to prevent any significant passage of air between the valve and the walls when the valve is so seated, by-pass elements connected to by-pass an idle air flow stream from one side of the valve to the other when the valve is so seated, fuel control elements devoid of an acceleration pump connected to (a) control the flow of fuel from the bowl to the air supply conduit, (b) shut off such flow when downstream of the throttle valve there is an increase in vacuum substantially above idle vacuum, and (c) supply an extra amount of fuel to the air supply conduit when such shut-off is terminated, and throttle-closing-delay means connected to prevent the throttle from closing abruptly.

13. The combination of claim 12 in which there is a power fuel supply mechanism connected to deliver fuel from the bowl to the air supply conduit to supply maximum power demand from the carburetion apparatus, and the power fuel supply is temperature compensated to supply more fuel at lower ambient temperatures than at higher ambient temperatures.

14. The combination of claim 12 in which there is a second intake manifold connected in parallel to the first intake manifold and a second air supply conduit connected to the second intake manifold and to the fuel bowl, the second manifold having an effective cross-sectional area substantially larger than that of the first manifold.

15. The combination of claim 14 in which the second air supply conduit has no provision for an idle air flow, and no provision for an idle fuel flow.

16. The combination of claim 15 in which the second air supply conduit has no provision for a power fuel flow.

17. The combination of claim 16 in which the second air supply conduit has its own throttle valve, and a selector mechanism is connected to essentially keep both throttles from being simultaneously open.

18. The combination of claim 1 in which the engine has an idle air consumption of about 0.15 pound per hour per cubic inch of displacement and the relationship between the air delivery rate and the engine r.p.m. drop falls essentially along the line AF of FIG. 3 when the engine is running at about 1400 r.p.m. and the throttle control is abruptly closed.

19. The combination of claim 1 in which the engine has an idle air consumption of about 0.15 pound per hour per cubic inch of displacement and the relationship between the air delivery rate and the engine r.p.m. drop falls essentially along the line EF of FIG. 3 when the engine is running at about 2400 r.p.m. and the throttle control is abruptly closed.

20. A gasoline engine having gasoline supply means for delivering gasoline to at least one cylinder, air supply means including a throttle control for delivering air along with the gasoline to provide an explosive mixture, both of said means being connected for limiting the reduction of air delivery when the throttle control is abruptly closed so that the relationship between the air delivery rate and the engine r.p.m. drop falls within the area ABCD of FIG. 3, both of said means being further connected to essentially shut off delivery of gasoline as the throttle control is abruptly closed if at that time the engine is running at more than 1450 r.p.m. the gasoline supply being also connected to resume delivery of gasoline when shutting off the supply of gasoline has caused the engine to decelerate to about 1000 r.p.m., and to at that time also deliver an additional 0.15 milliliter of gasoline for every 100 cubic inches of engine displacement.

21. A gasoline engine having gasoline supply means for delivering gasoline to at least one cylinder, air supply means including a throttle control for delivering air along with the gasoline to provide an explosive mixture, both of said means being connected for limiting the reduction of air delivery when the throttle control is abruptly closed so that the relationship between the air delivery rate and the engine r.p.m. drop falls within the area ABCD of FIG. 3, both of said means being further connected to essentially shut off delivery of gasoline as the throttle control is abruptly closed if at that time the engine is running at more than 1450 r.p.m., and the gasoline supply means and the air supply means are in form of the carburetion apparatus of claim 4.

22. A gasoline engine having gasoline supply means for delivering gasoline to at least one cylinder, air supply means including a throttle control for delivering air along with the gasoline to provide an explosive mixture, both of said means being connected for limiting the reduction of air delivery when the throttle control is abruptly closed so that the relationship between the air delivery rate and the engine r.p.m. drop falls within the area ABCD of FIG. 3, both of said means being further connected to essentially shut off delivery of gasoline as the throttle control is abruptly closed if at that time the engine is running at more than 1450 r.p.m., and the gasoline supply means and the air supply means are in the form of the carburetion apparatus of claim 5.

23. A gasoline engine having gasoline supply means for delivering gasoline to at least one cylinder, air supply means including a throttle control for delivering air along with the gasoline to provide an explosive mixture, both of said means being connected for limiting the reduction of air delivery when the throttle control is abruptly closed so that the relationship between the air delivery rate and the engine r.p.m. drop falls within the area ABCD of FIG. 3, both of said means being further connected to essentially shut off delivery of gasoline as the throttle control is abruptly closed if at that time the engine is running at more than 1450 r.p.m., a pair of parallel intake manifolds separately connecting each engine cylinder to both the gasoline supply means and the air supply means, one of the manifolds having an effective cross-sectional area substantially larger than that of the other, both the gasoline supply means and the air supply means being connected to deliver gasoline and air only through the manifold of smaller cross-section when such delivery does not significantly limit the power output, and the gasoline supply means and the air supply means are in the form of the carburetion apparatus of claim 5.

24. A gasoline engine having gasoline supply means for delivering gasoline to at least one cylinder, air supply means including a throttle control for delivering air along with the gasoline to provide an explosive mixture, both of said means being connected for limiting the reduction of air delivery when the throttle control is abruptly closed so that the relationship between the air delivery rate and the engine r.p.m. drop falls within the area ABCD of FIG. 3, both of said means being further connected to essentially shut off delivery of gasoline as the throttle control is abruptly closed if at that time the engine is running at more than 1450 r.p.m., a pair of parallel intake manifolds separately connecting each engine cylinder to both the gasoline supply means and the air supply means, one of the manifolds having an effective cross-sectional area substantially larger than that of the other, both the gasoline supply means and the air supply means being connected to deliver gasoline and air only through the manifold of smaller cross-section when such delivery does not significantly limit the power output, the gasoline supply means and the air supply means being further connected to deliver gasoline and air essentially only through the manifold of larger cross-section when at an engine speed the engine is called upon to deliver more power than it can with the manifold of smaller cross-section, and the gasoline supply means and the air supply means are in the form of the carburetion apparatus of claim 10.

25. A gasoline engine having gasoline supply means for delivering gasoline to at least one cylinder, air supply means including a throttle control for delivering air along with the gasoline to provide an explosive mixture, both of said means being connected for limiting the reduction of air delivery when the throttle control is abruptly closed so that the relationship between the air delivery rate and the engine r.p.m. drop falls within the area ABCD of FIG. 3, both of said means being further connected to essentially shut off delivery of gasoline as the throttle control is abruptly closed if at that time the engine is running at more than 1450 r.p.m., a pair of parallel intake manifolds separately connecting each engine cylinder to both the gasoline supply means and the air supply means, one of the manifolds having an effective cross-sectional area substantially larger than that of the other, both the gasoline supply means and the air supply means being connected to deliver gasoline and air only through the manifold of smaller cross-section when such delivery does not significantly limit the power output, and there is control means connected to shift the delivery of gasoline and air from one manifold to the other and from the other back to the one, said control means including provision for momentarily supplying extra gasoline to the engine when the shift is from the manifold of smaller cross-section to the manifold of larger cross-section, said control means being otherwise connected to essentially prevent the supply of gasoline and air through both manifolds simultaneously.

26. The combination of claim 2 in which there is control means connected to shift the delivery of gasoline and air from one manifold to the other and from the other back to the one, said control means including provision for momentarily overlapping the delivery of gasoline and air through both manifolds when the shift is from the manifold of smaller cross-section to the manifold of larger cross-section, said control means being otherwise connected to essentially prevent the supply of gasoline and air through both manifolds simultaneously.

27. A delay mechanism for delaying the closing of a throttle in a spark-ignition internal combustion engine, said mechanism having a delay unit for connection to the throttle-closing structure, and speed-responsive disabling elements connected to the delay unit for operation in response to the engine speed to terminate the throttle-closing delay when the engine speed is below about 1100 r.p.m.

28. A gasoline engine for operating an automobile, said engine having gasoline supply means for delivering gasoline to at least one cylinder, air supply means including a throttle control for delivering air along with the gasoline to provide an explosive mixture, both of said means being connected for limiting the reduction of air delivery when the throttle control is abruptly closed so that the relationship between the air delivery rate and the engine r.p.m. drop falls within the area ABCD of FIG. 3, both of said means being further connected to essentially shut off delivery of gasoline as the throttle control is abruptly closed if at that time the engine is running at more than 1450 r.p.m., and the throttle control includes the delay mechanism of claim 38.

29. The combination of claim 4 in which the throttle-closing-delay means has a delay unit connected to throttle closing structure, and speed-responsive disabling elements connected to the delay unit for operation in response to the engine speed to terminate the throttle-closing delay when the speed of an automobile operated by the engine is below about 12 miles per hour.

30. The combination of claim 10 in which the throttle-closing-delay means includes a delay unit for connection to the throttle-closing structure, and speed responsive disabling elements connected to the delay unit for operation in response to the speed of an engine having the carburetion apparatus, to terminate the throttle-closing delay when the engine speed is below about 1100 r.p.m.

31. The combination of claim 4 in which the fuel control elements are connected to supply the extra amount of fuel over a period of from about ½ to 2 seconds.

32. The combination of claim 17 in which the fuel control elements are connected to supply the extra amount of fuel over a one-second interval.

33. The combination of claim 4 in which the fuel control elements are connected to operate the fuel cut-off as well as the supply of the extra amount of fuel in response to pressure changes in an engine manifold, and these elements have a hysteresis of about 2 inches of mercury.

34. The combination of claim 4 in which the fuel control elements include a fuel jet connected to supply fuel from the bowl to the venturi, and the jet is temperature-compensated to supply more fuel at lower ambient temperatures than at higher ambient temperatures.

35. The combination of claim 34 in which the fuel jet is the main fuel jet.

36. The combination of claim 1 in which a pair of parallel intake manifolds separately connect each engine cylinder to both the gasoline supply means and the air supply means, one of the manifolds having an effective cross-sectional area substantially larger than that of the other, and both the gasoline supply means and the air supply means are connected to deliver gasoline and air only through the manifold of smaller cross-section when such delivery does not significantly limit the power output, and to exclude from the last-mentioned delivery any acceleration pump gasoline supply means.

37. A gasoline engine having gasoline supply means for delivering gasoline to at least one cylinder, air supply means including a throttle control for delivering air along with the gasoline to provide an explosive mixture, both of said means being connected for limiting the reduction of air delivery when the throttle control is abruptly closed so that the relationship between the air delivery rate and the engine r.p.m. drop falls within the area ABCD of FIG. 3, both of said means being further connected to essentially shut off the delivery of gasoline as the throttle control is abruptly closed if at that time the engine is running at more than 1450 r.p.m., a pair of parallel intake manifolds separately connecting each engine cylinder to both the gasoline supply means and the air supply means, one of the manifolds having an effective cross-sectional area substantially larger than that of the other, both the gasoline supply means and air supply means being connected to deliver gasoline and air only through the manifold of smaller cross-section when such delivery does not significantly limit the power output, and control means connected to shift the delivery of gasoline and air from one manifold to the other and from the other back to the one, said control means including gasoline pumping mechanism connected to momentarily deliver extra gasoline to the engine when the throttle is opened and the gasoline and air flow shifts from the manifold of smaller cross-section to the manifold of larger cross-section, said pump mechanism being further connected not to deliver extra gasoline to the engine when the throttle is opened under any other conditions.

38. A delay mechanism for delaying the closing of a throttle in a spark-ignition internal combustion engine used to operate an automobile, said mechanism having a delay unit for connection to the throttle-closing structure, and speed-responsive disabling elements connected to the delay unit for operation in response to the speed of the automobile to terminate the throttle-closing delay when that speed is below about 12 miles per hour.

39. The combination of claim 2 in which the gasoline supply means and the air supply means are connected to deliver to the manifold of smaller cross-section a combustion mixture having an air-to-fuel ratio of at least about 14 pounds of air per pound of fuel except when the power requirement approaches maximum.

References Cited by the Examiner
UNITED STATES PATENTS

| | | | |
|---|---|---|---|
| 1,623,750 | 4/1927 | Pingree | 123—127 |
| 1,982,049 | 11/1934 | Fageol. | |
| 2,386,669 | 10/1945 | Ericson | 123—127 |
| 2,879,756 | 3/1959 | Cornelius | 123—97 |
| 2,908,363 | 10/1959 | Dietrich | 123—97 X |
| 2,993,485 | 7/1961 | Cornelius | 123—97 |

KARL J. ALBRECHT, *Primary Examiner.*